United States Patent
Rui et al.

(10) Patent No.: US 8,849,273 B2
(45) Date of Patent: *Sep. 30, 2014

(54) METHOD AND SYSTEM FOR REPORTING FIXED NETWORK ACCESS INFORMATION

(75) Inventors: Tong Rui, Shenzhen (CN); Xiaoyun Zhou, Shenzhen (CN); Mo Sun, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/701,803

(22) PCT Filed: Jun. 7, 2011

(86) PCT No.: PCT/CN2011/075401
§ 371 (c)(1),
(2), (4) Date: Dec. 3, 2012

(87) PCT Pub. No.: WO2012/006909
PCT Pub. Date: Jan. 19, 2012

(65) Prior Publication Data
US 2013/0078998 A1   Mar. 28, 2013

(30) Foreign Application Priority Data
Jul. 14, 2010   (CN) .......................... 2010 1 0227613

(51) Int. Cl.
| H04W 4/00 | (2009.01) |
|---|---|
| H04L 29/12 | (2006.01) |
| H04W 12/08 | (2009.01) |
| H04W 4/24 | (2009.01) |
| H04L 29/06 | (2006.01) |
| H04W 40/20 | (2009.01) |
| H04M 15/00 | (2006.01) |
| H04W 76/02 | (2009.01) |
| H04L 12/24 | (2006.01) |
| H04L 12/14 | (2006.01) |
| H04W 48/18 | (2009.01) |

(52) U.S. Cl.
CPC ............... *H04W 40/20* (2013.01); *H04L 61/00* (2013.01); *H04W 12/08* (2013.01); *H04W 4/24* (2013.01); *H04W 76/022* (2013.01); *H04L 63/20* (2013.01); *H04L 41/0893* (2013.01); *H04L 63/10* (2013.01); *H04L 41/5041* (2013.01); *H04L 12/1407* (2013.01); *H04W 48/18* (2013.01); *H04M 15/66* (2013.01)
USPC ........ 455/426.1; 455/406; 455/407; 455/408; 455/410; 455/405; 379/114.28; 379/115.01; 379/126

(58) Field of Classification Search
USPC .............. 455/426.1, 406, 407, 408, 410, 405; 379/114.28, 115.01, 126
See application file for complete search history.

(56) References Cited

U.S. PATENT DOCUMENTS

| 2009/0088147 | A1* | 4/2009 | Bu et al. ......................... 455/423 |
|---|---|---|---|
| 2009/0254494 | A1* | 10/2009 | Li et al. ......................... 705/400 |
| 2011/0171953 | A1* | 7/2011 | Faccin et al. ................ 455/426.1 |
| 2012/0087260 | A1* | 4/2012 | Devarapalli et al. .......... 370/252 |
| 2012/0263041 | A1* | 10/2012 | Giaretta et al. ............... 370/236 |
| 2012/0265888 | A1 | 10/2012 | Roeland et al. |
| 2013/0052995 | A1* | 2/2013 | Shi ................................ 455/411 |

FOREIGN PATENT DOCUMENTS

| CN | 101022637 A | 8/2007 |
|---|---|---|
| CN | 101742699 A | 6/2010 |
| EP | 2547046 A1 | 1/2013 |
| WO | 2011082895 A1 | 7/2011 |

OTHER PUBLICATIONS

International Search Report in international application number: PCT/CN2011/075401, mailed on Sep. 15, 2011.
English Translation of the Written Opinion of the International Search Authority in international application number: PCT/CN2011/075401, mailed on Sep. 15, 2011.
Supplementary European Search Report in European application No. 11806251.2, mailed on Nov. 26, 2013. (12 pages—see entire document).

"3rd Generation Partnership Project; Technical Specification Group Services and System Aspects; Study on Support of BBF Access Interworking (Release 10)", 3GPP Standard; 3GPP TR AB.CDE, 3rd Generation Partnership Project (3GPP), Mobile Competence Centre; 650, Route des Lucioles; F-06921 Sophia-Antipolis Cedex; France, No. V0.1.0; May 21, 2010. (55 pages—see Supplementary European Search Report in European application No. 11806251.2 for relevant pages).

"3rd Generation Partnership Project;Technical Specification Group Services and System Aspects; Study on Support of BBF Access Interworking (Release 10)", 3GPP Standard; 3GPP TR 23.839, 3rd Generation Partnership Project (3GPP), Mobile Competence Centre; 650, Route des Lucioles; F-06921 Sophia-Antipolis Cedex; France, No. V0.1.1; Jun. 2, 2010. (55 pages—see Supplementary European Search Report in European application No. 11806251.2 for relevant pages).

Ericsson, "Fixed Mobile Interworking; Establishing the s9 Session", 3GPP Draft; FMC100031 PCFR-REQUESTED-S9-SESSION, 3rd Generation Partnership Project (3GPP), Mobile Competence Centre; 650, Route des Lucioles; F-06921 Sophia-Antipolis Cedex; France; Feb. 11, 2010. (6 pages—see Supplementary European Search Report in European application No. 11806251.2 for relevant pages).

Ericsson et al.: "Simplified solution for triggering S9* session from PCRF when using S2b", 3GPP Draft; S2-105826_WAS5380_BBAI_PCRF-INIT_USING_2SB, 3rd Generation Partnership Progect (3GPP), Mobile Competence Centre; 650, Route des Lucioles; F-06921 Sophia-Antipolis Cedex; France, vol. SA WG2, No. Jacksonville; Nov. 17, 2010. (18 pages—see Supplementary European Search Report in European application No. 11806251.2 for revelant pages).

Ericsson et al.: "Removal of Gxb* for 2Sb", 3GPP Draft; S2-111426_GXB REMOVAL, 3rd Generation Partnership Project (3GPP), Mobile Competence Centre; 650, Route des Lucioles; F-06921 Sophia-Antipolis Cedex; France, vol. SA WG2, No. Bratislava; Apr. 6, 2011. (55 pages—see Supplementary European Search Report in European application No. 11806251.2 for relevant pages).

3GPP: "3rd Generation Partnership Project; Technical Specification Group Core Network and Terminals; 3GPP System-Fixed Broadband Access Network Interworking; Stage 2 (Release 11)", 3GPP Draft; 23ABC-001_TS_BBAI_CL, 3rd Generation Partnership Project (3GPP), Mobile Competence Centre; 650, Route des Lucioles; F-06921 Sophia-Antipolis Cedex; France, vol. SA WG2; May 30, 2011. (71 pages—see Supplementary European Search Report in European application No. 11806251.2 for relevant pages).

* cited by examiner

*Primary Examiner* — Khalid Shaheed (74) *Attorney, Agent, or Firm* — Oppedahl Patent Law Firm LLC (57) ABSTRACT

The disclosure provides a method for reporting fixed network access information, in which an Evolved Packet Data Gateway (ePDG) reports fixed network access information to a Policy and Charging Enforcement Function (PCEF), and the PCEF notifies a Policy and Charging Rule Function (PCRF) of the fixed network access information. The disclosure also provides a system for reporting fixed network access information, in which a reporting unit is configured to allow an Evolved Packet Data Gateway (ePDG) to report fixed network access information to a Policy and Charging Enforcement Function (PCEF), which notifies a Policy and Charging Rule Function (PCRF) of the fixed network access information. According to the disclosure, the fixed network access information can be reported, so that an S9* session still can be established even if the BPCF cannot be aware of access of the UE to the WLAN.

6 Claims, 6 Drawing Sheets

METHOD AND SYSTEM FOR REPORTING FIXED NETWORK ACCESS INFORMATION

TECHNICAL FIELD

The disclosure relates to the field of mobile communications, and in particular to a method and system for reporting fixed network access information.

BACKGROUND

Figure 1:
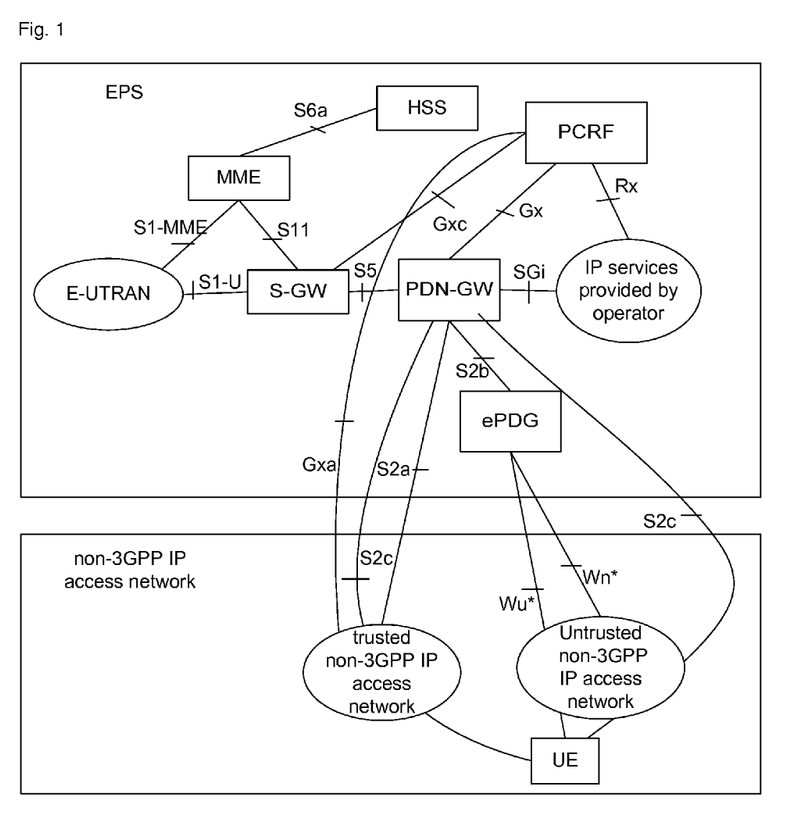
FIG. 1 shows a schematic diagram of the system architecture of the EPS in the related art.

The Evolved Packet System (EPS) proposed by the 3rd Generation Partnership Project (3GPP) consists of Evolved Universal Terrestrial Radio Access Network (E-UTRAN), Mobility Management Entity (MME), Serving Gateway (S-GW), Packet Data Network Gateway (PDN-GW), Home Subscriber Server (HSS), Authentication, Authorization and Accounting (AAA) server of the 3GPP, Policy and Charging Rules Function (PCRF) entity and other supporting nodes. FIG. 1 shows a schematic diagram of the system architecture of the EPS according to the related art. As shown in FIG. 1, the MME takes charge of mobility management, processing of Non-Access layer signaling, user mobility management, context management and other related tasks at the control plane; The S-GW is an access gateway device connected to the E-UTRAN, transfers data between the E-UTRAN and the PDN-GW, and takes charge of caching paging waiting data; The PDN-GW (P-GW for short) is a border gateway between the EPS and the Packet Data Network (PDN), and takes charge of access to the PDN and data transfer between the EPS and the PDN; both the S-GW and the PDN-GW are core network gateways; The PCRF is connected to the Internet Protocol (IP) service network through a receiving interface Rx, so as to acquire service information. Moreover, the PCRF is also connected to a gateway device in the network through a Gx/Gxa/Gxc interface, takes charge of initiating of establishment of IP bearer, ensuring of Quality of Service (QoS) of service data, and charging control.

The EPS supports interworking of the 3GPP system with a non-3GPP system, wherein, the interworking is implemented via an S2a/b/c interface, and the PDN-GW serves as an anchor between the 3GPP system and the non-3GPP system. In the system architecture diagram of the EPS, the non-3GPP IP access network system is divided into a trusted non-3GPP IP access network and an untrusted non-3GPP IP access network. The trusted non-3GPP IP access network can be directly connected to the PDN-GW via the S2a interface; the untrusted non-3GPP IP access network may be connected to the PDN-GW via an Evolved Packet Data Gateway (ePDG); the S2b interface is used between ePDG and PDN-GW; the S2c interface provides both control and mobility support for a user plane and between a User Equipment (UE) and the PDN-GW, and supports the mobility management protocol, Mobile IPv6 Support for Dual Stack Hosts and Routers (DSMIPv6).

In the EPS system, the Policy and Charging Enforcement Function (PCEF) entity is located in the PDN-GW, and exchanges information with the PDN-GW via the Gx interface, as shown in FIG. 1. When the interface between PDN-GW and S-GW is based on PMIPv6, the S-GW includes a Bearer Binding and Event Report Function (BBERF) entity to process QoS control for service data flows, the S-GW exchanges information with the PCRF through the Gxc interface, as shown in FIG. 1. When the access is performed through the trusted non-3GPP access system, the BBERF may reside on the trusted non-3GPP access gateway. The trusted non-3GPP access gateway exchanges information with the PCRF via the Gxa interface, as shown in FIG. 1. When the UE is roaming, the S9*interface becomes an interface between a home PCRF and a visitor PCRF, and at the same time, provides Application Functions (AFs) of services for the UE. The S9*interface transmits service information for formulating the Policy and Charging Control (PCC) policy, to the PCRF via the Rx interface. In the 3GPP, a PDN network can be found by using its corresponding Access Point Name (APN). Connection of the UE to the PDN network is usually called an IP Connectivity Access Network (IP-CAN) session. In the process of establishing the IP-CAN session, each of the BBERF and the PCEF establishes a Diameter session with the PCRF, in order to transmit policy and charging information for controlling the IP-CAN session, information for formulating the policy and the like. Wherein, the Diameter session is based on the Diameter protocol, which is an upgraded version of the Remote Authentication Dial In User Service (RADIUS) protocol.

Figure 2:
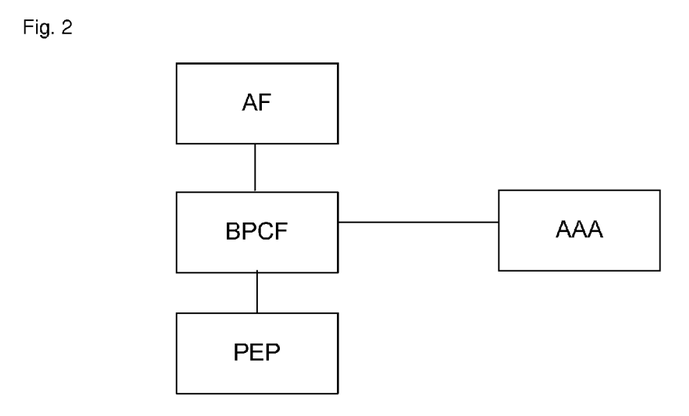
FIG. 2 shows an architecture diagram of the BBF BPCF in the related art.

A corresponding Broadband Forum (BBF) has proposed a broadband policy control architecture, i.e., Broadband Policy Control Function (BPCF), as shown in FIG. 2. The BPCF is mainly used to formulate corresponding policies; a Policy Enforcement Point (PEF) usually resides in a transmitting device in the fixed network, such as a Broadband Remote Access Server (BRAS)/a Broadband Network Gateway (BNG), so as to implement the policy as formulated by the BPCF; the AAA server is configured to store user contract information. The AF formulates policies for the BPCF, and provides corresponding service information. Currently, the architecture of the BPCF is still rough, and related details are still being specified.

The Fixed Mobile Convergence (FMC) scenario, which has become a great concern of the operators, is being researched based on interconnection and interworking between the 3GPP and the BBF. In the scenario of a user accessing the mobile core network through the BBF fixed network, the QoS on all routing paths of data (which will pass through the fixed network and the mobile network) needs to be guaranteed. At the present stage, this is performed by using the S9*interface, which is located between the PCRF and the BPCF. To operate services better and broaden the wireless coverage, a mobile operator may hire a piece of line accessing a Wireless Local Area Network (WLAN) from a fixed network operator, considering cost saving. In the case that the UE performs access through the WLAN of the fixed network, as transmission of the data will pass through the fixed network, the UE will establish an IP security (IP-Sec) tunnel with the ePDG when the mobile operator regards the network provided by the fixed network operator as untrusted, so as to ensure that the data transmitted between the UE and the ePDG is encrypted, and the contents being transmitted cannot be learned by the transmitting device in the fixed network. In the related art, there are two practical deployment modes as follows.

Figure 3:
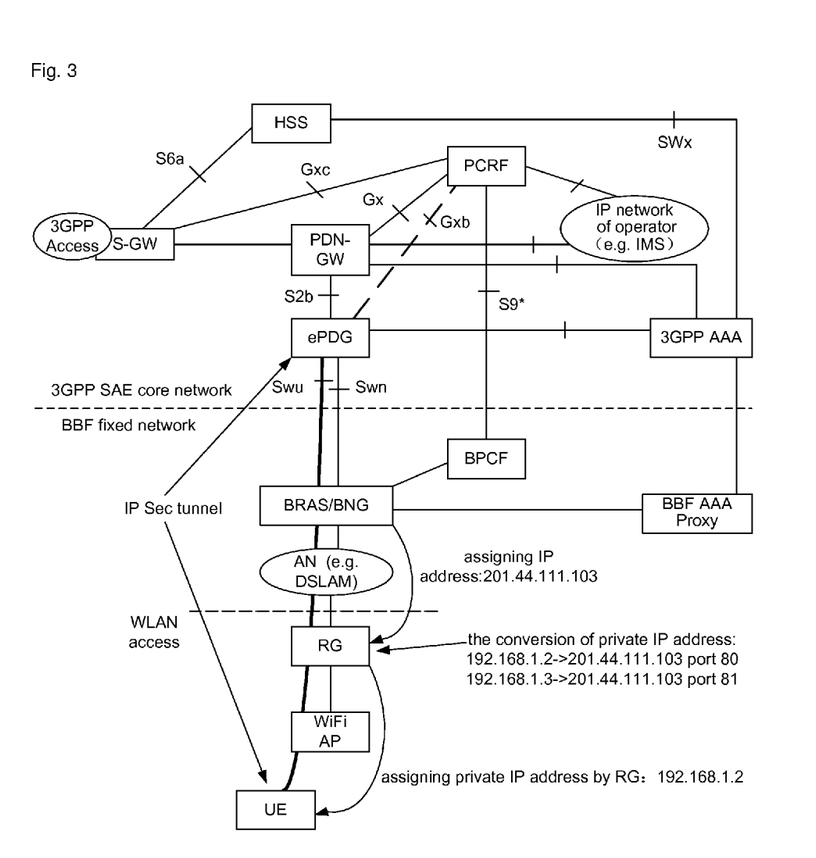
FIG. 3 is a schematic diagram showing that the UE accesses the EPS core network through the WLAN in the related art.

Mode 1: as shown in FIG. 3, the UE accesses the Residential Gateway (RG) through the WiFi access point, and accesses the Broadband Remote Access Server (BRAS) or BNG through an Access Note (AN), such as a Digital Subscriber Line Access Multiplexer (DSLAM). Since in this case, the IP address of the UE is assigned by the RG while the IP address of the RG is assigned by the BRAS/BNG, the RG needs to perform an IP address conversion. Wherein, the assigning of the IP address for the UE by the RG, may be implemented in the following way. For example, when the UE accesses the RG, the UE is authenticated on the RG by using its user name and password, and the RG assigns an internal address for the UE when authentication is passed. The assigning of the IP address for the RG by the BRAS/BNG may be implemented in the following way. For example, when the RG is powered on, the RG initiates authentication to the BRAS/BNG and the BRAS/BNG assigns an IP address for the RG.

Figure 4:
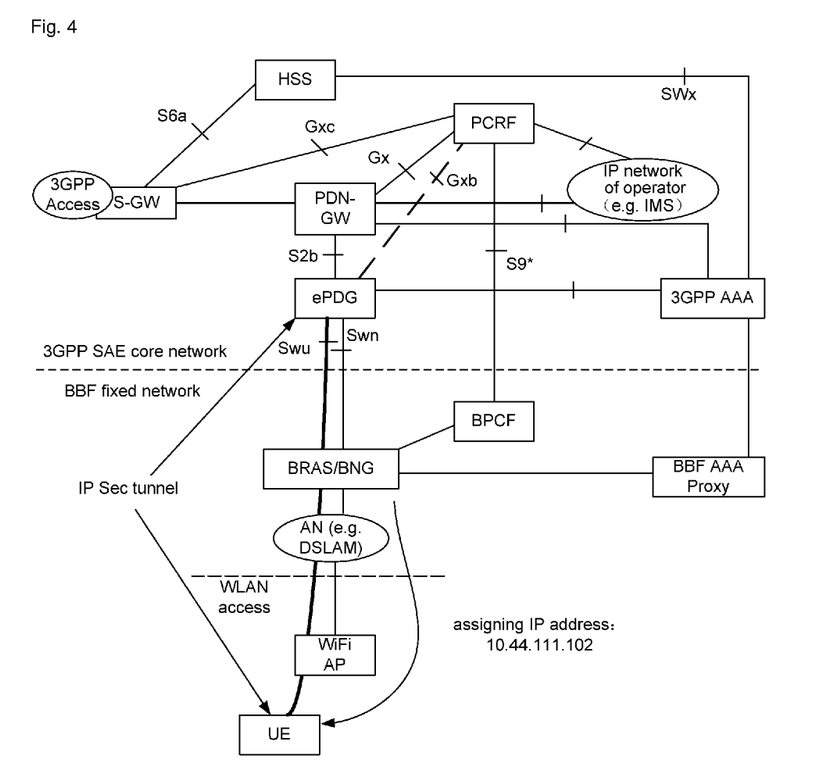
FIG. 4 is another schematic diagram showing that UE accesses the EPS core network through the WLAN in related art.

Mode 2: as shown in FIG. 4, the UE performs access through a WiFi access point, and accesses the BRAS/BNG through an AN, wherein the IP address of the UE here is assigned by the BRAS/BNG. Wherein, for accessing the BRAS/BNG through an AN, of course there may be an RG between the AN and the BRAS/BNG when accessing, but to be different from mode 1, in this mode, the RG does not assign an IP address for the UE, the RG here is just a layer-two device not assigning an IP address for the UE, and the connections of the RG to the UE and the BRAS are layer-two connections.

For saving address space, the IP address assigned by the fixed network operator for the UE or the RG by using the BRAS/BNG may be a private IP address. In this case, the BRAS/BNG also needs to perform an IP address conversion.

In mode 2, as the BRAS/BNG assigns an IP address for the UE and authenticates the UE, and the BRAS/BNG is located in the BBF fixed network, the BBF fixed network may be aware of the access of UE to the WLAN, and the BPCF may also be aware of the access of UE to the WLAN, for example, the BPCF may be aware of the access of the UE to the WLAN through the BNG/BRAS or the BBF AAA, so that the BPCF may initiate establishment of an S9* session to the PCRF. However, in mode 1, the UE will not be authenticated on the BRAS/BNG when the UE accesses the WLAN through the RG, because the UE has been authenticated on the RG and the RG has assigned an IP address for the UE. Therefore, the BBF fixed network may not be aware of the access of UE to the WLAN, and the BPCF may not be aware of the access of UE to the WLAN, either. For example, when the UE transmits a message, the RG converts the source IP address of the UE of the message to a combination of the IP address of the RG itself and a certain port. Thus, it seems from the BRAS/BNG that the received IP message is the IP message from the RG, the particular UE behind the RG will not be detected, and accordingly, the BPCF cannot initiate an S9* session to the PCRF. In sum, in the related art, the S9* session cannot be initiated if the BPCF cannot be aware of the access of the UE to the WLAN, because the S9* session is initiated by the BPCF to the PCRF, and the premise for initiating the S9* session is that the BPCF must be aware of the access of the UE to the WLAN. A technical solution is needed, in which fixed network access information can be reported, such that an S9* session still can be established even if the BPCF cannot be aware of the access of the UE to the WLAN.

SUMMARY

In view of the above, the disclosure provides a method and system for reporting fixed network access information, which can report the fixed network access information, so that an S9* session still can be established even if the BPCF cannot be aware of access of the UE to the WLAN.

The technical solutions of the disclosure are provided as follows.

A method for reporting fixed network access information comprises: reporting, by an Evolved Packet Data Gateway (ePDG), fixed network access information to a Policy and Charging Enforcement Function (PCEF), and notifying, by the PCEF, a Policy and Charging Rule Function (PCRF) of the fixed network access information.

Wherein, the fixed network access information may contain location information of the User Equipment (UE);I the reporting may comprise: accessing, by the UE, a mobile core network through a Wireless Local Area Network (WLAN); reporting, by the ePDG, the location information of the UE to the PCEF; and notifying, by the PCEF, the PCRF of the location information of the UE.

Wherein, the method may further comprises: initiating, by the PCRF, establishment of an S9* session to a Broadband Policy Control Function (BPCF) corresponding to the location information of the UE, according to the location information of UE.

Wherein, the location information of the UE may contain at least one of the identifier of the UE and tunnel information.

Wherein, the identifier of UE may contain a fixed network access identifier of the UE;

the tunnel information may contain: local IP address information of the UE, which contains at least one of IP address and port information for the UE and ePDG to establish an IP-Sec tunnel; wherein in the scenario of no Network Address Translation (NAT), the IP address information may contain a public network IP address assigned for the UE by a Broadband Remote Access Server (BRAS)/Broadband Network Gateway (BNG);

in the scenario where a Residential Gateway (RG) acts as the NAT, the IP address information may contain a public network IP address assigned for the RG by the BRAS/BNG;

in the scenario where the BRAS/BNG act as the NAT, the IP address information may contain an address of the BRAS/BNG.

A system for reporting fixed network access information, comprises: a reporting unit, configured to allow an Evolved Packet Data Gateway (ePDG) to report fixed network access information to a Policy and Charging Enforcement Function (PCEF), which notifies a Policy and Charging Rule Function (PCRF) of the fixed network access information.

Wherein, the fixed network access information may contain location information of the User Equipment (UE);I the reporting unit may be further configured to allow the UE to access a mobile core network through a Wireless Local Area Network (WLAN), to allow the ePDG to report the location information of UE to the PCEF, which notifies the PCRF of the location information of UE.

Wherein, the system may further comprise: a session establishment unit, configured to allow the PCRF to initiate establishment of an S9* session to a Broadband Policy Control Function (BPCF) corresponding to the location information of the UE, according to the location information of UE.

Wherein, the location information of the UE may contain at least one of the identifier of the UE and tunnel information.

Wherein, the identifier of UE may contain a fixed network access identifier of the UE; the tunnel information may contain: local IP address information of the UE, which contains at least one of IP address and port information for the UE and ePDG to establish an IP-Sec tunnel.

Wherein, in the scenario of no Network Address Translation (NAT), the IP address information may contain a public network IP address assigned for the UE by a Broadband Remote Access Server (BRAS)/Broadband Network Gateway (BNG).

Wherein, in the scenario where a Residential Gateway (RG) acts as the NAT, the IP address information may contain a public network IP address assigned for the RG by the BRAS/BNG.

Wherein, in the scenario where the BRAS/BNG act as the NAT, the IP address information may contain an address of the BRAS/BNG.

In the disclosure, the ePDG reports fixed network access information to the PCEF, and the PCEF notifies the PCRF of the fixed network access information.

Compared with the related art, according to the disclosure, the fixed network access information can be reported to the PCRF, and the PCRF can initiate establishment an S9* session to the BPCF, so that an S9* session still can be established even if the BPCF cannot be aware of access of the UE to the WLAN.

DETAILED DESCRIPTION

The basic idea of the disclosure is that: the ePDG reports fixed network access information to the PCEF, and the PCEF notifies the PCRF of the fixed network access information.

The implementations of technical solutions will be described below in detail with reference to the accompanying drawings.

According to the technical solutions of the disclosure, the fixed network access information can be reported to the PCRF, and the PCRF can initiate establishment of an S9* session to the BPCF, so that an S9* session still can be established even if the BPCF cannot be aware of access of the UE to the WLAN. Further, according to the disclosure, the establishment of an S9* session is initiated by the PCRF. Compared with the related art in which the establishment of the S9* session is initiated by the BPCF, an improvement has been made to the process of the related art. Therefore, provided that the fixed network access information is known, the establishment of the S9* session may be initiated. An unified flow is adopted by the disclosure, which is applied to not only the scenario where the BPCF cannot be aware of the access of the UE to the WLAN, but also the scenario where the BPCF may be aware of the access of the UE to the WLAN.

A method for reporting fixed network access information mainly comprises:

the ePDG reports fixed network access information to the PCEF, and the PCEF notifies the PCRF of the fixed network access information.

Further, in the scenario where the BPCF cannot be aware of the access of the UE to the WLAN, the PCRF is used to establish the S9* session with the BPCF after the access information of fixed network is learned; Accordingly, as a unified flow, in the scenario where the BPCF can be aware of the access of the UE to the WLAN, the PCRF is used to establish the S9* session with the BPCF after the access information of fixed network is learned.

It should be noted that the S9* interface here refers to an evolved interface based the S9 interface. The S9* session refers to an evolved session based on the S9. In this document, the term "S9*" is used to express an involvement to S9. However, any other terms which may perform the function of the disclosure fall within the scope of the disclosure and the description thereof will be omitted here.

Further, the fixed network access information includes the location information of the UE.

Further, when the UE accesses the mobile core network through the WLAN and establishes an IP-Sec tunnel to the ePDG, the ePDG notifies the PCEF of the location information of the UE through the S2b interface, wherein the location information of UE may include at least one of the identifier of the UE and the tunnel information.

Further, the S2b interface is located between the ePDG and the PDN-GW, and the PCEF entity exists in the PDN-GW, the S2b interface is embodied as corresponding to the tunnel between the ePDG and the PCEF. The tunnel includes a GTP tunnel or a PMIP tunnel. Wherein, GTP represents GPRS Tunnel Protocol, GTP is the tunnel Protocol in General Packet Radio Service; PMIP represents Proxy MIP, PMIP is the Proxy Mobile IP tunnel Protocol.

Further, the identifier of the UE includes the fixed network access identifier of the UE. The tunnel information includes at least one of IP address information and port information used in establishment of the IP-Sec tunnel between the UE and the ePDG. The IP address information includes: a public network IP address assigned for the UE by the BRAS/BNG, or a public network IP address assigned for the RG by the BRAS/BNG, or the address of the BRAS/BNG.

Further, the PCEF notifies the PCRF of the location information of the UE through the Gx interface after receiving the location information of the UE.

Further, the PCRF initiates the establishment of S9* session to the BPCF after receiving the location information of the UE, and transmits the location information of the UE to the BPCF.

The disclosure is described below with reference to embodiments.

Embodiment 1: attachment process that UE accesses the mobile core network through the fixed network WLAN.

The UE accesses the mobile core network through a fixed network WLAN access. When the UE accomplishes the fixed network access authentication and establishes an IP-Sec tunnel with the ePDG (BBERF), the BBERF transmits the location information of the UE to the PCEF via an S2b interface (corresponding to the GTP or PMIP tunnel between the BBERF and the PCEF), the location information of UE may include the identifier of the UE and tunnel information. The PCEF, after receiving the location information of the UE, carries the location information of the UE in a Proxy Binding Update (PBU) message and transmits the location information of the UE to the PCRF. The PCRF establishes the S9* session with the BPCF after receiving the location information of the UE, and transmits the location information of the UE to the BPCF.

Wherein, the identifier of the UE includes the fixed network access identifier of the UE. The tunnel information includes IP address information and port information used in establishment of the IP-Sec tunnel between the UE and the ePDG. The IP address information includes: a public network IP address assigned for the UE by the BRAS/BNG, or a public network IP address assigned for the RG by the BRAS/BNG, or the address of the BRAS/BNG.

Figure 5:
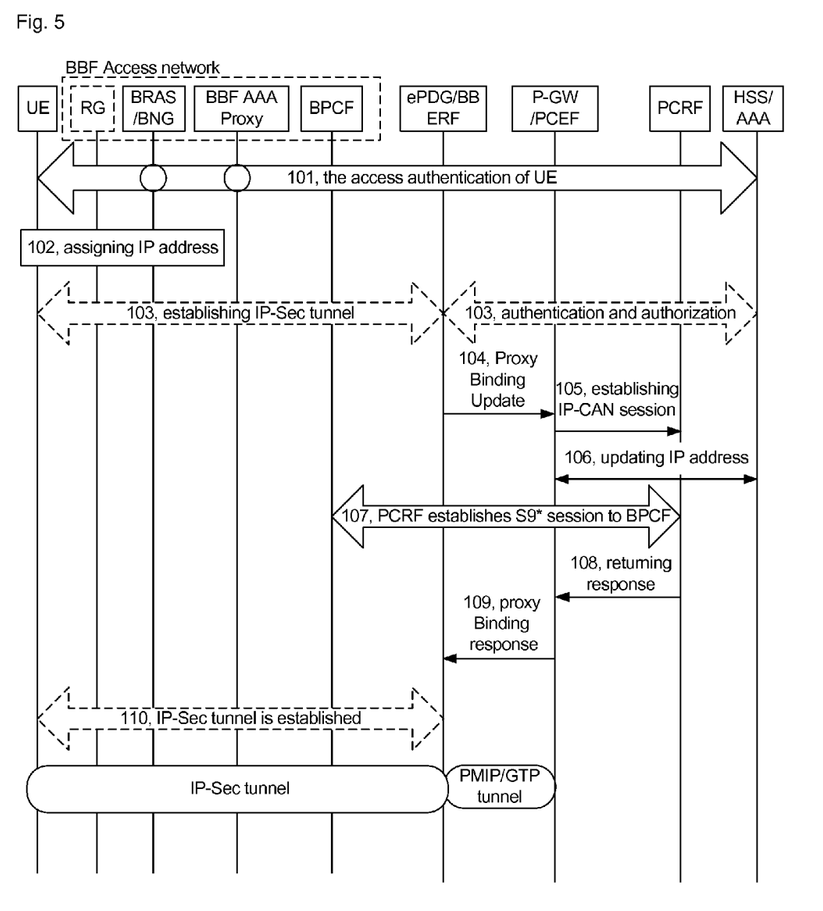
FIG. 5 is a flow chart showing access of the UE through the WLAN of the fixed network according to embodiment 1 of the disclosure.

The embodiment as shown in FIG. 5 includes the following steps.

Step 101, the UE accesses the mobile core network through the BBF fixed network, and accomplishes access authentication. The process of authentication may involve the BRAS/BNG and the BBF AAA Proxy.

Step 102, the BBF fixed network assigns an IP address for the UE. The IP address may be assigned for the UE by the BNG or the RG, as described in the Background section.

Step 103, an IP-Sec tunnel is established between the UE and the ePDG, the ePDG initiates authentication and authorization to the 3GPP AAA, and 3GPP AAA returns the address of the PDN-GW.

Step 104, ePDG (BBERF) initiates Proxy Binding Update to the PCEF.

Here, the location information of the UE is included in the Proxy Binding Update message, the location information of UE may include the identifier of the UE and tunnel information. The identifier of UE may be the fixed network access ID of the UE; the tunnel information may be IP address information and port information used in the establishment of the IP-Sec tunnel between the UE and the ePDG. The IP address information includes: a public network IP address assigned for the UE by the BRAS/BNG, or a public network IP address assigned for the RG by the BRAS/BNG, or the address of the BRAS/BNG.

Step 105, the PCEF initiates an IP-CAN session establishing request to the PCRF.

Here, the request message may include the location information of the UE, and the location information of the UE may include the fixed network access identifier of the UE and the tunnel information.

Step 106, the PDN-GW updates the IP address to the HSS/AAA.

Here, step 106 and step 105 may be performed concurrently.

Step 107, the PCRF establishes an S9* session to the BPCF according to the location information of the UE.

Here, when the PCRF establishes the S9* session to the BPCF, for example, the PCRF learns the access location information according to the IP address information and port information and sends the S9* session to the corresponding BPCF. The S9* session may include the IP address information. The PCRF establishes a corresponding PCC strategy for the IP-CAN session after the admission control request is accomplished;

Step 108, the PCRF returns a response to the PCEF.

Here, the response message may include a corresponding PCC rule;

Step 109, the PGW responds a proxy binding response to the ePDG, and accomplishes the establishment of the PMIP or GTP tunnel between the ePDG and the PDN-GW.

Step 110, after receiving the proxy binding response, the ePDG indicates to the UE that the IP-Sec tunnel is established successfully.

Embodiment 2: the process of the access of the UE through the 3GPP and then switching from the 3GPP access mode to the WLAN access mode.

The UE performs the access through the 3GPP, and switches from the 3GPP access mode to the WLAN access mode when a WLAN signal is detected, for example, when the user comes home from work, the UE switches from the 3GPP access mode to the WLAN access mode at home. When the UE accomplishes the fixed network access authentication and establishes an IP-Sec tunnel with the ePDG (BBERF), the BBERF transmits the location information of the UE to the PCEF via an S2b interface. The location information of UE may include the identifier of the UE and tunnel information. The PCEF, after receiving the location information of the UE, carries the location information of the UE in a PBU message and transmits the location information of the UE to the PCRF. The PCRF establishes the S9* session with the BPCF after receiving the location information of the UE, and transmits the location information of the UE to the BPCF.

Wherein, the identifier of the UE includes the fixed network accessing identifier of the UE. The tunnel information includes IP address information and port information used in the establishment of the IP-Sec tunnel between the UE and the ePDG. The IP address information includes: a public network IP address assigned for the UE by the BRAS/BNG, or a public network IP address assigned for the RG by the BRAS/BNG, or the address of the BRAS/BNG.

Figure 6:
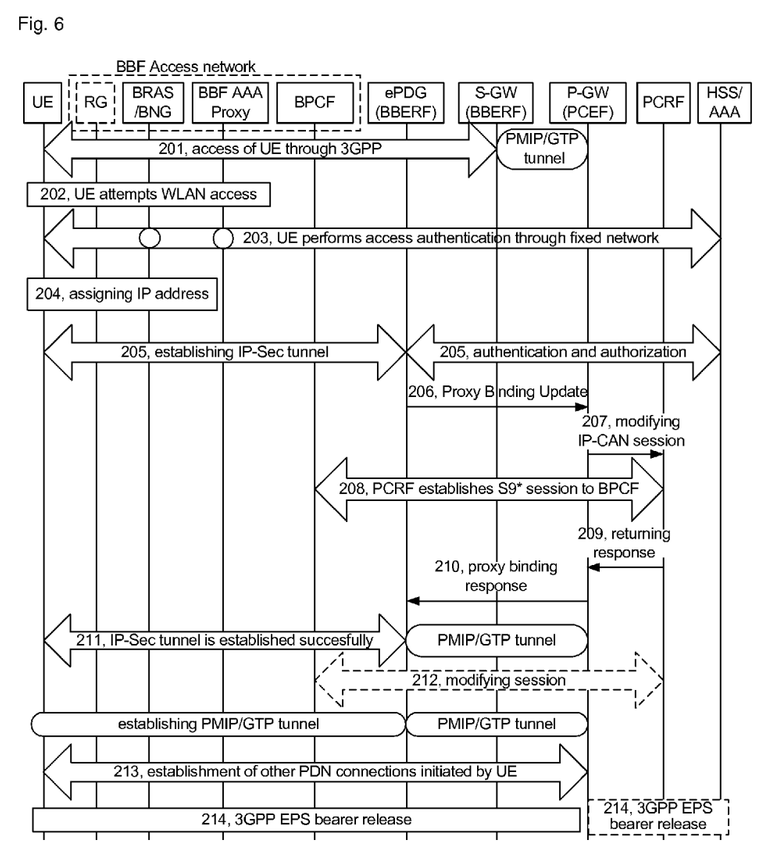
FIG. 6 is a flow chart showing access of the UE through 3GPP and switching from 3GPP access to WLAN access according to embodiment 2 of the disclosure.

The embodiment as shown in FIG. 6 includes the following steps.

Step 201, the UE performs the access through the 3GPP and establishes EPS bearer, wherein a PMIP or GTP tunnel is established between the S-GW and PDN-GW directly.

Step 202, a WLAN signal is detected by the UE, the UE attempts the WLAN access, for example, when the user comes home from work, the user performs the access through the WLAN at home.

Step 203, the UE accesses mobile core network through the BBF fixed network, and accomplishes access authentication. The process of authentication may involve the BRAS/BNG and the BBF AAA Proxy.

Step 204, the BBF fixed network assigns an IP address for the UE, the IP address may be assigned for the UE by the BNG or the RG, as described in the Background section.

Step 205, an IP-Sec tunnel is established between the UE and the ePDG, the ePDG initiates authentication and authorization to the 3GPP AAA, and the 3GPP AAA returns the address of the PDN-GW.

Step 206, the ePDG (BBERF) initiates Proxy Binding Update to the PCEF.

Here, the location information of the UE is included in the Proxy Binding Update message, the location information of the UE may include the identifier of the UE and tunnel information. The identifier of UE may be the fixed network access ID of the UE; the tunnel information may be IP address information and port information used in establishment of the IP-Sec tunnel between the UE and the ePDG. The IP address may be a public network IP address assigned for the UE by the BRAS/BNG, or a public network IP address assigned for the RG by the BRAS/BNG, or the address of the BRAS/BNG.

Step 207, the PCEF initiates an IP-CAN session establishing request to the PCRF.

Here, the request message includes the location information of the UE, which may include the fixed network access identifier of the UE and the tunnel information.

Step 208, the PCRF establishes an S9* session with the BPCF.

Here, when the PCRF establishes the S9* session with the BPCF according to the location information of the UE, for example, the PCRF learns the access location information of the UE according to the IP address information and port information and sends the S9* session to the corresponding BPCF. The S9* session includes the IP address information.

Step 209, the PCRF returns a response to the PCEF.

Here, the response message may include a corresponding PCC rule established for the IP-CAN session by the PCRF.

Step 210, the PGW returns a proxy binding response to the ePDG, and accomplishes the establishment of the PMIP or GTP tunnel between the ePDG and the PDN-GW.

Step 211, after receiving the proxy binding response, the ePDG indicates to the UE that the IP-Sec tunnel is established successfully.

Step 212, the PCRF may initiate a resource admission request. This step can be performed after step 208.

Step 213, the UE may initiate establishment of other PDN connections.

Step 214, the PDN-GW initiates EPS bearer release of the 3GPP access.

A system for reporting fixed network access information comprises a reporting unit, which is configured to allow an Evolved Packet Data Gateway (ePDG) to report fixed network access information to a Policy and Charging Enforcement Function (PCEF), which notifies a Policy and Charging Rule Function (PCRF) of the fixed network access information.

Here, the fixed network access information may include the location information of the UE.

Here, the reporting unit is further configured to allow the UE to access a mobile core network through a Wireless Local Area Network (WLAN), to allow the ePDG to report the location information of UE to the PCEF, which notifies the PCRF of the location information of UE.

Here, the system further includes a session establishment unit, configured to allow the PCRF to initiate establishment of an S9* session to a Broadband Policy Control Function (BPCF) corresponding to the location information of the UE, according to the location information of UE.

Here, the location information of UE specifically includes the identifier of the UE and/or the tunnel information.

Here, the identifier of the UE specifically includes the fixed network accessing identifier of the UE; the tunnel information specifically includes IP address information and/or port information used in establishment of the IP-Sec tunnel between the UE and the ePDG.

The descriptions above are only preferred embodiments of the disclosure and are not intended to limit the scope of protection of the disclosure.

The invention claimed is:

1. A method for reporting fixed network access information, comprising:
   after a user equipment (UE) accesses a mobile core network through a Wireless Local Area Network (WLAN), reporting, by an Evolved Packet Data Gateway (ePDG), fixed network access information containing location information of the UE to a Policy and Charging Enforcement Function (PCEF);
   notifying, by the PCEF, a Policy and Charging Rule Function (PCRF) of the fixed network access information; and
   initiating, by the PCRF, establishment of an S9* session to a Broadband Policy Control Function (BPCF) corresponding to the location information of the UE, according to the location information of the UE,
   wherein the location information of the UE contains at least one of an identifier of the UE and tunnel information.

2. The method according to claim 1, wherein the identifier of UE contains a fixed network access identifier of the UE;
   wherein the tunnel information contains: local IP address information of the UE, which contains at least one of IP address and port information for the UE and ePDG to establish an IP-Sec tunnel;
   wherein in the scenario of no Network Address Translation (NAT), the IP address information contains a public network IP address assigned for the UE by a Broadband Remote Access Server (BRAS)/Broadband Network Gateway (BNG);
   wherein in the scenario where a Residential Gateway (RG) acts as the NAT, the IP address information contains a public network IP address assigned for the RG by the BRAS/BNG; and
   wherein in the scenario where the BRAS/BNG act as the NAT, the IP address information contains an address of the BRAS/BNG.

3. A system for reporting fixed network access information, comprising:
   a reporting unit, configured, after a User Equipment (UE) accesses a mobile core network through a Wireless Local Area Network (WLAN), to allow an Evolved Packet Data Gateway (ePDG) to report fixed network access information containing location information of the UE to a Policy and Charging Enforcement Function (PCEF), which notifies a Policy and Charging Rule Function (PCRF) of the fixed network access information; and
   a session establishment unit, configured to allow the PCRF to initiate establishment of an S9* session to a Broadband Policy Control Function (BPCF) corresponding to the location information of the UE, according to the location information of UE,
   wherein the location information of the UE contains at least one of an identifier of the UE and tunnel information.

4. The system according to claim 3, wherein the identifier of UE contains a fixed network access identifier of the UE;
   wherein the tunnel information contains: local IP address information of the UE, which contains at least one of IP address and port information for the UE and ePDG to establish an IP-Sec tunnel;
   wherein in the scenario of no Network Address Translation (NAT), the IP address information contains a public network IP address assigned for the UE by a Broadband Remote Access Server (BRAS)/Broadband Network Gateway (BNG);
   wherein in the scenario where a Residential Gateway (RG) acts as the NAT, the IP address information contains a public network IP address assigned for the RG by the BRAS/BNG; and
   wherein in the scenario where the BRAS/BNG act as the NAT, the IP address information contains an address of the BRAS/BNG.

5. An Evolved Packet Data Gateway (ePDG), comprising:
   a reporting unit, configured, after a User Equipment (UE) accesses a mobile core network through a Wireless Local Area Network (WLAN), to report fixed network access information containing location information of the UE to a Policy and Charging Enforcement Function (PCEF), which notifies a Policy and Charging Rule Function (PCRF) of the fixed network access information,
   wherein the location information of the UE contains at least one of an identifier of the UE and tunnel information;
   wherein the identifier of UE contains a fixed network access identifier of the UE:
   wherein the tunnel information contains: local IP address information of the UE, which contains at least one of IP address and port information for the UE and ePDG to establish an IP-Sec tunnel;
   wherein in a scenario of no Network Address Translation (NAT), the IP address information contains a public network IP address assigned for the UE by a Broadband Remote Access Server (BRAS)/Broadband Network Gateway (BNG);

wherein in a scenario where a Residential Gateway (RG). acts as the NAT, the IP. address information contains a public network IP address assigned for the RG by the BRAS/BNG; and wherein in a scenario where the BRAS/BNG act as the NAT, the IP address information contains an address of the BRAS/BNG.

6. The ePDG according to claim 5, further comprising:

a tunnel establishment unit, configured, after the UE accesses the mobile core network through the WALN, to establish an IP-Sec tunnel with the UE, and to acquire and send the fixed network access information to the reporting unit.

* * * * *